(12) United States Patent (10) Patent No.: US 12,696,176 B2
Shire (45) Date of Patent: Jul. 28, 2026

(54) WIRELESS COMMUNICATIONS FOR VEHICLES

(71) Applicant: VOLVO TRUCK CORPORATION, Gothenburg (SE)

(72) Inventor: Joshua Shire, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 311 days.

(21) Appl. No.: 18/322,266

(22) Filed: May 23, 2023

(65) Prior Publication Data

US 2023/0413162 A1 Dec. 21, 2023

(30) Foreign Application Priority Data

May 23, 2022 (EP) .................................... 22174959

(51) Int. Cl.
*H04W 48/10* (2009.01)
*H04W 56/00* (2009.01)
(52) U.S. Cl.
CPC ......... *H04W 48/10* (2013.01); *H04W 56/001* (2013.01)
(58) Field of Classification Search
CPC . H04W 48/10; H04W 56/001; H04W 12/069; H04W 12/61; H04W 12/122; H04L 63/1466
See application file for complete search history.

(56) References Cited

U.S. PATENT DOCUMENTS

| 2008/0303648 A1 | 12/2008 | Day | |
| 2017/0093866 A1* | 3/2017 | Ben-Noon | .......... H04W 12/068 |
| 2020/0119825 A1* | 4/2020 | Lin | ................... H04W 72/0446 |
| 2020/0236548 A1 | 7/2020 | Escott et al. | |

(Continued)

FOREIGN PATENT DOCUMENTS

| EP | 3692746 A1 | 8/2020 | |
| EP | 3692746 B1 * | 10/2021 | .............. H04W 4/40 |

(Continued)

OTHER PUBLICATIONS

Extended European Search Report in corresponding European Application No. 22174959.1 dated Nov. 4, 2022 (7 pages).

*Primary Examiner* — Umair Ahsan
(74) *Attorney, Agent, or Firm* — Jeffri A. Kaminski; Venable LLP

(57) ABSTRACT

A method includes configuring a plurality of global broadcast parameters using an out-of-band communication channel and using at least one of the plurality of global broadcast parameters to form a broadcast unique identifier code for a network advertising broadcast. The global broadcast parameters include at least one synchronization value and one or more global parameters based on the capabilities of both the broadcaster and the observer comprising: a minimum network advertising broadcast interval between sequential network advertising broadcasts, a minimum network advertising broadcast synchronization, MinNABS offset comprising a minimum interval between transmission of a synchronization value and the network advertising broadcast, and a maximum network advertising broadcast synchronization, MaxNABS, offset comprising a maximum validity time-period for a synchronization value. In this way, replay attacks which spoof the broadcaster may be prevented.

20 Claims, 4 Drawing Sheets

(56) References Cited

U.S. PATENT DOCUMENTS

| | | | | |
|---|---|---|---|---|
| 2020/0296779 A1* | 9/2020 | Moghe | .................. | H04B 3/544 |
| 2020/0389927 A1* | 12/2020 | Lin | ......................... | H04W 4/70 |
| 2021/0138982 A1* | 5/2021 | Schumacher | ......... | H04W 12/08 |
| 2021/0345112 A1* | 11/2021 | Elliott | ................ | H04W 12/122 |

FOREIGN PATENT DOCUMENTS

| | | | |
|---|---|---|---|
| WO | 2019068314 A1 | 4/2019 |
| WO | 2021222662 A1 | 11/2021 |

* cited by examiner

WIRELESS COMMUNICATIONS FOR VEHICLES

The disclosed technology relates to wireless communications for vehicles, and in particular, but not exclusively, to a method of establishing a wireless communications channel between a vehicle and a vehicle accessory, for example, a trailer or body-builder equipment, using dynamic codes and related aspects.

The disclosed technology can be applied in vehicles and heavy-duty vehicles, such as trucks, semi-trailer vehicles, buses and construction vehicles. Although the disclosure describes forming a connection between a vehicle such as a truck and an accessory such as a trailer, as will be apparent, a wireless connection may be formed according to the disclosed technology in many other types of vehicles, heavy-duty vehicles and working machines which are configured to be used with different types of accessories or implements.

BACKGROUND

A heavy vehicle such as a truck is often configured in a modular manner to allow it to use a range of different accessories. For example, a truck may be configured to allow it to be attached to trailers, for example, from a variety of different manufacturers. Vehicle telematics is increasing requiring a communication channel to be established between a vehicle and its accessory. In a scenario where a truck is coupled with an accessory such as a trailer or another accessory, a bi-directional communication channel between the truck and the trailer may need to be established.

Such scenarios may occur frequently in large vehicle fleets comprising a large number of trucks where it may be quite common for trucks to be connected to trailers from different manufacturers and vendors. Accordingly, each vehicle should be able to easily communicate with different types of accessories, for example, body building equipment, trailers, as well as other types of vehicle accessories, which may be from different manufacturers and vendors.

It has long been common practice to form a communication channel between a vehicle and a vehicle accessory using a CAN-bus. The communication possibilities over a CAN bus however are somewhat limited, for example, it can only support up to 64 nodes due to electrical loading and adding and removing nodes can be somewhat complicated. To support more nodes and high data volumes and transfer rates, wireless communications between a vehicle and a vehicle accessory are becoming increasingly preferred.

With the increasing complexity and functionality of vehicle accessories, it is becoming increasingly important to be able to communicate with the accessory in a convenient manner and to potentially transfer large amounts of data. Accordingly, many accessories are being provided with Internet of Things, IoT, type functionality such that they can communicate wirelessly with other devices. However securely setting up a wireless communication channel with an IoT device may be require manual steps which have to be performed by the operator of the vehicle.

In view of the above, it is desirable to provide a wireless connection between a heavy vehicle such as a truck and a vehicle accessory, such as a trailer, without having to burden the vehicle operator with additional operations when connecting the accessory to the vehicle.

International Patent Application WO2019068314A1 discloses in its abstract a method for establishing a wireless communication channel between a vehicle and a vehicle accessory. The method comprises, in the vehicle, detecting a wired communication channel between the vehicle and the accessory, transmitting a vehicle identifier from the vehicle to the accessory via the wired communication channel, receiving an accessory identifier; deriving a unique code based on the vehicle identifier and the accessory identifier using a predetermined function, broadcasting the unique code by a vehicle wireless transceiver. In the vehicle accessory: deriving the unique code based on the vehicle identifier and the accessory identifier using the same predetermined function as used in the vehicle; receiving the broadcast unique code, determining that the received code corresponds to the determined unique code, finding a network broadcasting the unique code; and establishing a wireless connection between the wireless transceiver of the vehicle and the wireless transceiver of the accessory using the network characterized by the unique code.

However, a weakness with this approach is that a malicious actor could, having itself received the unique code broadcast by the vehicle, add the same code to its broadcasts to cause the accessory to attempt to associate to it rather than the intended vehicle. This is called a "replay attack". This attack could result in disclosure of confidential information, or denial or service, or form the base for further attacks against the vehicle or accessory on systems not directly related to vehicle to accessory communication.

United States Patent Application US2020/0296779 discloses that a device of a tractor unit determines that the tractor unit is connected to a trailer via physical cabling. The device sends, via the physical cabling, a powerline communication (PLC) message to the trailer that includes a service set identifier (SSID) and password for a Wi-Fi transceiver of the tractor unit. The Wi-Fi transceiver of the tractor unit receives an association request sent wirelessly from a Wi-Fi transceiver of the trailer that is based on the sent SSID and password. The device establishes the Wi-Fi transceiver of trailer as a Wi-Fi client of the Wi-Fi transceiver of the tractor unit.

United States Patent Application US2008/303648 discloses how communications between a tractor and trailer are established and secured using a wired connection between the physically connected tractor and trailer. Wireless ID or authentication information is communicated between tractor and trailer using the wired connection. Thereafter, a wireless, secure RF communication link may be established between the tractor and trailer using the ID/authentication information. Further, wireless messages may be encrypted between tractor and trailer using the identification/authentication information received over the wired connection.

United States Patent Application US2021345112 discloses methods and apparatus for detecting and handling evil twin access points (APs). The method and apparatus employ trusted beacons including security tokens that are broadcast by trusted APs. An Evil twin AP masquerades as a trusted AP by broadcasting beacons having the same SSID as the trusted AP, as well as other header field and information elements IE in the beacon frame body containing identical information. A sniffer on the trusted AP or in another AP that is part of a Trusted Wireless Environment (TWE) receives the beacons broadcasts by other APs in the TWE including potential evil twin APs. The content in the header and one or more IEs in received beacons are examined to determine whether a beacon is being broadcast by an evil twin. Detection of the evil twin are made by one of more of differences in MAC addresses of trusted and untrusted beacons, time jitter measurements and replay detection using timestamps in the beacons, detection of missing security tokens in untrusted beacons and detection that a security token that is mimicked by an evil twin is invalid. In one aspect, the security token is stored in a vendor-specific IE in trusted beacons that is generated by employing a secret key using a cryptographic operation operating on data in the beacon prior to the vendor-specific IE.

A problem exists in that a secure identifier is required that is both not predictable and is resistant to replay attack. Known techniques may require clock synchronization across a system and may use timestamps or some time-based value to prevent a replay. Although they may raise the level of sophistication required for a replay attack to be successful, they have only a very short window of error to functionally prevent determined replay attacks.

The disclosed technology seeks to mitigate, obviate, alleviate, or eliminate various issues such as those mentioned above which are known in the art.

SUMMARY STATEMENTS

This summary is provided to introduce simplified concepts that are further described below in the Detailed Description. This summary is not intended to identify essential features of the claimed subject matter, nor is it intended for use in determining the scope of the claimed subject matter. Examples of aspects and embodiments of the invention are set out in the accompanying claims and also below.

A first aspect of the disclosed technology comprises a method for establishing a wireless communication channel between a broadcaster, for example, a network advertising transmitter, and an observer, the method comprising configuring a plurality of global broadcast parameters between the broadcaster, for example, the network advertising transmitter, and the observer using an out-of-band communication channel; and using at least one of the plurality of preconfigured global broadcast parameters to form a unique broadcast identifier code for a subsequent network advertising broadcast, for example, a subsequent network advertising broadcast, wherein the global broadcast parameters include one or more global broadcast parameters based on capabilities of both the broadcaster, for example, the network advertising transmitter, and the observer and a synchronization value for a subsequent broadcast event, wherein, the one or more predefined global broadcast parameters comprise one or more of: a minimum network advertising broadcast interval between sequential network advertising broadcasts, a minimum network advertising broadcast synchronization, MinNABS offset comprising a minimum interval between transmission of the synchronization value and the subsequent network advertising broadcast event, and a maximum network advertising broadcast synchronization, MaxNABS, offset comprising a maximum validity time-period for the synchronization value.

By using a plurality of global broadcast parameters, the method may better prevent replay attacks. The relative timings of multiple different communications which form different network advertising broadcast events may be used as well to provide a stronger authentication factor for the network advertising transmitter (also referred to herein as a broadcaster or access point, AP,) to prevent replay attacks. As will be known in the art, a broadcast event comprises a transmission, which from a practical perspective is essentially a simultaneous transmission, of multiple beacons or packets which may be received by any of one or more observers within signal range of the transmitter. An observer receiving a network advertising broadcast can use the information to obtain at least the source address of the transmitter of the network broadcast to access its data communications network.

In some embodiments, the network advertising transmitter comprises a wireless access point.

In some embodiments, the network advertising transmitter broadcasts network advertising packets or beacons in a network advertising broadcast event.

In some embodiments, the broadcast comprises a multicast.

In some embodiments, multiple beacons or packets are simultaneously delivered in a multicast to a known group of observers who have no accessible history of previously connecting to the network transmitter providing the multicast.

In some embodiments, the network advertising transmitter multicasts network advertising packets or beacons in a network advertising broadcast event.

In some embodiments, the method is performed by the network advertising transmitter, which may be a vehicle or a vehicle accessory.

In some embodiments, the vehicle may be a heavy-duty vehicle such as a truck or construction vehicle. The vehicle accessory may be a trailer or body builder equipment in some embodiments.

In some embodiments, instead of broadcasting, a multicast may be performed by the transmitter or broadcaster advertising the network.

Embodiments of the disclosed technology which use pre-agreed broadcast timing intervals or pre-agreed timing off-sets to establish a time-interval of time which must between one or more of sequential network advertising broadcasts is that a more robust and secure system is provided against relay attacks by spoof network access points. Embodiments which use a predetermined minimum interval between a transmission of a synchronization value and a subsequent network advertising broadcast, e.g. a subsequent beacon advertising a network access point together with a maximum validity time-period for the synchronisation value may be even more secure. The disclosed technology accordingly provides an improved system for a vehicle to identify which access point it should connect to compared with systems which merely use timing jitter to distinguish between a genuine network access point access broadcasting or multicasting packets or beacons advertising its network is available for connection to and a spoof network access point which has intercepted beacons from the genuine access point so as to perform a relay attack with a view to misdirecting connection requests from vehicles or vehicle accessories seeking to connect with the genuine network access point so they instead connect to the spoof network access point.

In some embodiments, configuring the global parameters comprises: negotiating the one or more global parameters via a negotiation algorithm executed by the network advertising transmitter and the observer prior to each broadcast network advertisement; and transmitting one or more of the negotiated global parameters from the network advertising transmitter to the observer.

In some embodiments, the network advertising transmitter comprises a vehicle and the observer comprises a vehicle accessory.

In some embodiments, the network advertising transmitter comprises a vehicle accessory and the observer comprises a vehicle.

In some embodiments, the vehicle comprises a heavy-duty vehicle and the vehicle accessory comprises a trailer.

In some embodiments, the vehicle comprises a heavy-duty vehicle and the vehicle accessory comprises body builder equipment. The body builder equipment may be mounted on or integrated with a trailer in some embodiments.

In some embodiments, the out-of-band communications channel is a wired channel.

In some embodiments, the out-of-band communications channel is a wired channel comprising a CAN-bus connection.

In some embodiments the out-of-band communications channel is a wireless communication channel conforming to a different type of communications protocol than the in-band channel. For example, the out-of-band channel may comprises a cellular network connection in some embodiments and the inbound channel may comprise a Wi-Fi network.

In some embodiments, the configuring of the broadcast parameters using an out of band communication channel comprises at the network advertising transmitter, prior to each broadcast network advertisement: generating a random or initially random but incrementing value as a synchronization value, and transmitting the random or initially random but incrementing value as a synchronization value to the observer, wherein the unique code comprises a unique code that is valid only for that individual broadcast event within the agreed parameters, wherein the unique code is generated using a predetermined function based on the synchronization value transmitted to the observer.

In some embodiments, the method further comprises, at the observer, receiving the one or more global synchronization parameters including a synchronization value; and using the synchronization value within a predetermined function to generate a unique code that is valid only for that individual broadcast event within the agreed synchronization parameters.

In some embodiments, the unique broadcast identifier code for the network advertising broadcast identifies each broadcast network advertising packet.

In some embodiments, the method further comprises establishing a wireless connection between the wireless transceiver of the network advertising transmitter and the wireless transceiver of the observer using the network characterized by the unique broadcast identifier code.

In some embodiments, the predetermined function is a hash function.

In some embodiments, establishing the wireless connection further comprises authenticating the observer using a shared secret, wherein the shared secret is based on a broadcast identifier and an observer identifier and wherein the shared secret is different from the code.

In some embodiments, the wireless communications channel is a Wi-Fi channel, and the transceivers of the network advertising transmitter and observers are Wi-Fi transceivers.

In some embodiments, the unique code is broadcast as an information element in a beacon frame.

Advantageously, the disclosed technology set or automatically agree upon synchronization parameters to prevent replay attacks using a wired, out of band communication channel. Advantageously, by using a synchronization value within the predetermined function, e.g. a hash function, to form a unique code for a network advertisement broadcast by a network advertising transmitter, e.g. a vehicle (or instead the vehicle accessory), it to allow an observer, for example, a vehicle accessory (or instead the vehicle), to recognize the network advertising transmitter.

Advantageously, the unique code is dynamic per broadcast event, rather a static value that is calculated and then broadcast until received by the intended receiver.

Advantageously, in addition to the disclosed methods not allowing an opportunity for a replay attack, the network advertising transmitter and observer do not need to synchronize their clocks.

Another aspect of the disclosed technology comprises a system for establishing a wireless communication channel between a network advertising transmitter and an observer, the system comprising means for configuring a plurality of synchronization parameters and means for using at least one of the plurality of synchronization parameters to form a broadcast unique identifier code for a network advertising broadcast, wherein the synchronization parameters include one or more or all of the following global parameters based on the capabilities of both the network advertising transmitter and the observer: a minimum network advertising broadcast interval between sequential network advertising broadcasts, a minimum network advertising broadcast synchronization, MinNABS offset comprising a minimum interval between transmission of a synchronization value and a network advertising broadcast; and a maximum network advertising broadcast synchronization, MaxNABS, offset comprising a maximum validity time-period for a synchronization value.

Some embodiments of the system further comprises means or one or more modules for implementing a method according to any of the disclosed embodiments of the method aspect.

Another aspect of the disclosed technology comprises a vehicle arrangement comprising:

a vehicle comprising a vehicle wireless transceiver, an accessory comprising an accessory wireless transceiver, wherein either the vehicle is configured to act as a network advertising transmitter and the accessory is configured to act as an observer and establish a communication channel using the method aspect or any one of its disclosed embodiments or wherein the vehicle is configured to act as an observer and the accessory is configured to act as a network advertising transmitter and establish a communications channel using the method aspect or any one of its embodiments.

Another aspect of the disclosed technology comprises a heavy-vehicle configured to perform a method according to the first aspect or any of its embodiments.

Another aspect of the disclosed technology comprises a heavy-vehicle accessory configured to perform a method according to the first aspect or any of its embodiments.

Another aspect of the disclosed technology comprises a control unit or control circuitry for a network advertising transmitter apparatus or an observer apparatus comprising memory, one or more processors or processing circuitry, and computer-program code which, when loaded from memory and executed by the one or more processors or processing circuitry causes the control system or control circuitry to control at least the network advertising transmitter to perform steps of the method aspect according to any of the disclosed embodiments, wherein either the network advertising transmitter of the method comprises a vehicle and at least one observer comprises a vehicle accessory or the network advertising transmitter of the method comprises a vehicle accessory and at least one observer comprises a vehicle.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION OF EMBODIMENTS

Figure 2:
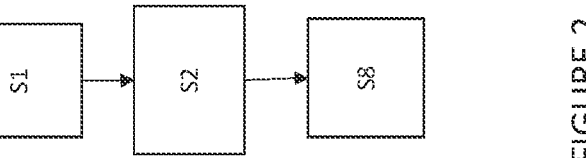
FIG. 2 is a flow chart outlining the general steps of a method according to an embodiment of the disclosed technology.

Example embodiments of the present disclosure will be described more fully hereinafter with reference to the accompanying drawings. The apparatus and methods disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

In the present detailed description, various embodiments of a method for establishing a wireless connection between a vehicle and a vehicle accessory are mainly discussed with reference to a truck having a trailer connected thereto. It should however be noted that this by no means limits the scope of the present invention which is equally applicable to many different types of vehicles and vehicle accessories as would be apparent to anyone of ordinary skill in the art.

Figure 1:
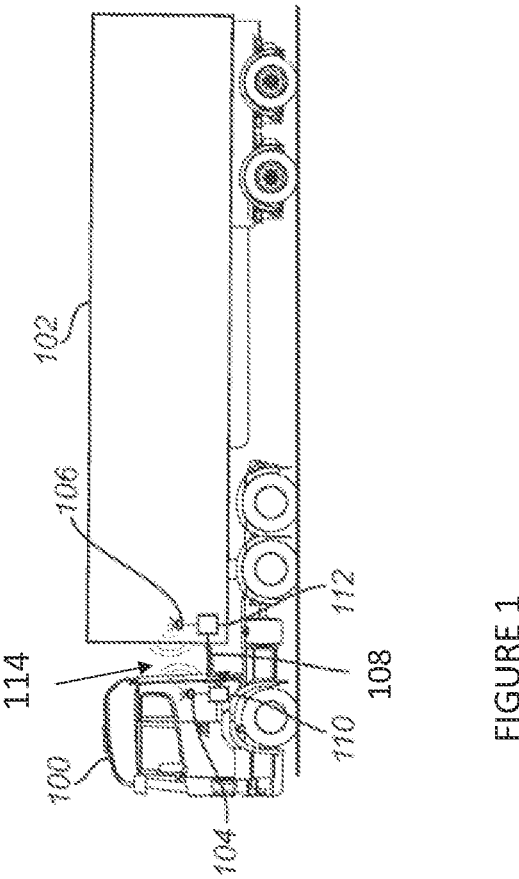
FIG. 1 shows schematically a vehicle arrangement according to an embodiment of the disclosed technology.

FIG. 1 illustrates schematically a transmitter/observer arrangement comprising a vehicle 100 and accessory arrangement—in the depicted example, the accessory is a trailer 102 arrangement. One example of a vehicle accessory which may be used with a heavy duty vehicle 100 (also referred to herein as a heavy vehicle) comprises a trailer with a container, which may include a refrigerated container mounted on the trailer. Another example of a vehicle accessory which may be used with a heavy duty vehicle 100 (also referred to herein as a heavy vehicle) comprises body builder equipment.

As shown in FIG. 1, the vehicle 100 is shown schematically having the form of a truck. Vehicle 100 comprises a vehicle wireless transceiver 104 and an accessory 102 in the form of a trailer, comprising an accessory wireless transceiver 106. The vehicle may act as a transmitter in some embodiments, in which case the accessory will act as an observer. However, in some embodiments, the vehicle accessory may act as the transmitter, in which case the vehicle will act as the observer. The network advertising transmitter is configured to broadcast a unique network identifying code which identifies the network and which also identifies the transmitter as the source of the signal it is transmitting.

In some embodiments described herein, the network advertising transmitter is referred to as a "broadcaster", however the term broadcaster is not limited to network advertising transmitters which broadcast. The term "broadcaster" refers to a transmitter which is sending a signal which a plurality of observers can detect and process, where the transmitted signal may be broadcast or multicast. References herein to broadcast and broadcasting are considered to include multi-cast and multicasting where this is possible and so do not exclude multicast and multicasting unless the context requires it. A network access point is an example of a transmitter which can broadcast and in some contexts multicast packets or beacons which advertise the network access point is available to be connected to, for example, by vehicles and/or vehicle accessories etc.

The network advertising signal which is transmitted includes unique code identifying the signal source referred to herein as a unique network broadcast code. By broadcasting a unique code which advertises a network is available for forming connections with the transmitter, the transmitter may communicate with one or more observers in a uni-directional or bi-directional manner. In other words, the unique code advertises the network is available to observers, and allows one or more observers, for example, a vehicle or vehicle accessory, to form a connection with the broadcaster or network advertiser. The type of broadcaster (the network broadcasting (or multicasting) entity) may be one of a vehicle or vehicle accessory depending on the relevant use context. The term multicast or multicasting may refer to a limited broadcast to closed group of receivers (in other words, to a limited group of observers) rather than a true broadcast to any receiver or observer in some embodiments.

In some embodiments, the term "broadcaster" accordingly refers to a network advertising transmitter which is capable of multi-casting to a predetermined group of device or types of device. A vehicle may function both as a broadcaster and as an observer, in some embodiments, contemporaneously, for example, it may relay communications on which it receives from an observer of its network broadcast to a broadcaster advertising its own network.

In the following, in some embodiments the term "truck" is used interchangeably with vehicle or heavy-duty vehicle, and the term "trailer" is used interchangeably with accessory to illustrate various embodiments of the disclosed technology. In other words, the term "truck" may be used as a representative example of a vehicle which may be a heavy or heavy-duty vehicle. Embodiments disclosed herein which refer to a "truck" should accordingly be interpreted to refer to other types of vehicle, including other types of heavy or heavy-duty vehicles, for example, to a fork-lift truck, to a lorry, to a crane or dumper truck or other type of construction equipment/vehicle unless the context contradicts this. The truck may comprise a chassis equipped with a passenger's cabin and powertrain components and other components necessary to the operation of the truck such as an air compressor, steering, lighting etc. The truck comprises an on-board electrical network to which the accessory may be connected to be operated.

The term the vehicle accessory does not only refer to a trailer per se and may be a type of body builder equipment or comprise a trailer with a container or item of equipment mounted on a trailer or integrated with a trailer. The vehicle accessory may be loaded onto the truck itself, without the need for a trailer or other wheels or mechanism to pull the accessory behind the truck. The truck may include an area for loading the accessory—for example, a flat bed to receive a container (where the container does not have wheels).

In some embodiments, the vehicle accessory may comprise auxiliary equipment, for example, body builder equipment. Body builder equipment comprises equipment that can be added to a vehicle or build on a vehicle chassis to tailor the vehicle to a specific need. The body builder equipment may include wheels or be mounted on wheels such that the vehicle can pull the equipment—in the same manner as a trailer can be pulled. In some embodiments, the body builder equipment forms a trailer or is mounted on or integrated with a trailer. Body builder equipment (or auxiliary equipment) may be an add-on to the vehicle, and thus be installed subsequently to designing and manufacturing the vehicle itself. When installing such add-on to the vehicle, the current electromobility system of the vehicle may be used also to power the added auxiliary equipment or body builder equipment. Body builder equipment may be fitted a posteriori by a truck body builder, connected to the on-board electrical network and configured to be supplied by the on-board electrical network.

Examples of body builder equipment include equipment for construction, such as a crane or cement mixer. For example, the accessory may be a skip loader or another type of loader. The accessory may be a modification to allow the truck to receive a load in a particular way, such as tail-gate lift, or a hook lift, or tipper, or may be a swap system (for a swap body or exchangeable container) or a bulk compressor. The accessory may be a car transporter life and ramps. The accessory may be climate control equipment or may be a climate-controlled container, for example a cooler, a refrigerator (e.g. heat pump and/or fans), or a refrigerated container. The accessory may be refuse equipment, for example waste collection equipment or waste compacting/processing equipment, or for example a sewage/slurry truck pump. The accessory may be firetruck equipment or other safety equipment. The accessory may comprise a ladder or other equipment to allow access to a difficult-to-reach area. The accessory may comprise an access vehicle ladder. For the purposes of this disclosure, a "trailer" is depicted and described, but this may refer to any suitable vehicle accessory such as those described above.

In some embodiments, the vehicle accessory is a trailer chassis which can be adapted for a variety of different applications using body building equipment or it may be specially adapted for a particular type of application. For example a chassis such as a Volvo™ trucks chassis, may be configured for body building a crane by having a low chassis and high axel loads. However, other applications may use different axel configurations, chassis heights, and wheelbases. In some embodiments, the vehicle accessory comprises a chassis configured with an upper rear frame end cut (suitable for body-building a tipper, hook-lift, or refuse truck for example). In some embodiments, the vehicle accessory comprises a chassis configured with or a lower rear frame end cut (suitable for body building a centre axle trailers). In some embodiments, the vehicle accessory comprises a chassis configured with a bent rear frame end cut (suitable for body building a tractor). In some embodiments, the vehicle accessory comprises a chassis configured with a straight rear frame end cut (for use, for example, with rigids).

The truck/vehicle may function as a transmitter, in other words, a broadcaster in some embodiments of the disclosed technology in which case the trailer/accessory functions as an observer. In some embodiments, however, the roles are reversed.

The term "global broadcast parameters" includes a reference to at least one global broadcast parameter based on one or more capabilities of both the broadcaster and the observer and to a global broadcast synchronization parameter value which is to be used to generate unique code for a subsequent broadcast.

The wireless receivers 104, 106, may comprise Wi-Fi transceivers in some embodiment. However, other suitable wireless communications protocol may be used in other embodiments.

In some embodiments, the out-of-band communications channel 108 comprises a wired communication channel 108 between the transmitter and the observer which takes the form of a CAN-bus connection between the vehicle 100 and the vehicle accessory 102.

In some embodiments of the disclosed technology, the CAN-bus connection is used for off-line out-of-band communications. The CAN-bus may operate using standardized messages, for example, messages which are in accordance with ISO standard IS011992 which is a CAN based bus standard by the heavy-duty truck industry used for communication between a tractor type of heavy-duty vehicle and one or more trailers. Another type of wired communications channel 108 could comprise a channel according to the SAE J1939 standard recommendation which is a vehicle bus practice recommendation for communication and diagnostics amongst vehicle components .

These bus-type wired communications channels however may have relatively low throughput which means that they are increasingly becoming less suitable for modern vehicles where large amounts of data may need to be transmitted between the vehicle 100 and the accessory 102.

As shown schematically in FIG. 1, the vehicle 100 further comprises a control unit or system 110 for controlling the vehicle 100 and in particular for controlling the vehicle wireless transceiver 104 such that a wireless connection 108 with the accessory 102 can be established. In the present context, the vehicle wireless transceiver 104 acts as the access point (truck-side), while the accessory wireless transceiver 106 is the wireless client (accessory side) in a typical access-point-vs-client setup. As mentioned above, however, in some embodiments, the vehicle 100 may be controlled by the control unit 100 to act as an observer instead.

The control unit 110 may include a microprocessor, microcontroller, programmable digital signal processor or another programmable device. The control unit 110 may also, or instead, include or comprise control circuitry such as an application specific integrated circuit, a programmable gate array or programmable array logic, a programmable logic device, or a digital signal processor.

Where the control unit 110 includes a programmable device such as the microprocessor, microcontroller or programmable digital signal processor mentioned above, the processor may further include computer executable code that controls operation of the programmable device.

The control unit 110 is connected to the wireless transceiver 104 of the transmitter and is configured to control both the wired connection channel 108 and the wireless transceiver 104 so that they cooperate with the observer. In some embodiments, the observer is provided with a control unit, for example, a control unit may be connected to the vehicle accessory so that the vehicle and vehicle accessory in combination perform a method according to various embodiments of the disclosed technology.

Moreover, the control 110 system may be embodied by one or more physical control units, where each control unit may be either a general purpose control unit or a dedicated control unit for performing a specific function. The control system 110 may comprise a distributed control system 110 in some embodiments where the vehicle accessory and vehicle both have individual control units.

In other words, in some embodiments, the vehicle accessory 102 comprises a corresponding accessory control unit 112 connected to the accessory wireless transceiver 106 which is configured to handle the communication by the accessory 102.

FIG. 2 is a flow chart outlining an embodiment of a method of establishing a wireless communication channel between a broadcaster 100 and an observer 102, which, for example, may be performed by the broadcaster 100. As shown in FIG. 2, the method comprises configuring a plurality of synchronization parameters using an out-of-band communication channel in S1 and using at least one of the plurality of synchronization parameters to form a broadcast unique identifier code for a network advertising broadcast in S2. The method then comprises an observer obtaining the unique code and using it to establish wireless connection observer in S8. The synchronization parameters used include one or more or all of the following global parameters based on the capabilities of both the broadcaster and the observer: a minimum network advertising broadcast interval between sequential network advertising broadcasts; a minimum network advertising broadcast synchronization, MinNABS offset comprising a minimum interval between transmission of a synchronization value and the network advertising broadcast; and a maximum network advertising broadcast synchronization, MaxNABS, offset comprising a maximum validity time-period for a synchronization value. The unique code can then be used to establish a wireless connection over the advertised network with an observer in S8 who recognized the unique code advertising that network transmitted by the broadcaster as the observer participated in the configuration of the global synchronization parameters.

Advantageously, in some embodiments of the disclosed technology, by setting or automatically agreeing upon synchronization parameters using an out-of-band communications channel in S1, for example, a wired out-of-band communications channel, replay attacks may be reduced or prevented. In some embodiments, a negotiation algorithm may be used in S1 to allow the broadcaster and an observer to agree upon a set of global broadcast parameters. Accordingly, some embodiments of the method comprise negotiating or agreeing one or more predefined global parameters via a negotiation algorithm executed by the broadcaster and the observer prior to each broadcast network advertisement which is also shown in FIG. 3 (in S1A) and transmitting one or more of the one or more predefined global parameters from the broadcaster to the observer (shown in FIG. 3 as S1C).

Some embodiments of the method use a synchronization value within a predetermined function, for example, within a hash function, to form the unique broadcast code which acts as a network advertisement. Observers which detect the unique broadcast code and which are able to use it to recognize the source transmitting the code, in other words, the broadcaster 100, are then able to form a connection with the broadcaster which is less likely to originate from a fake or spoofed source address. In some embodiments where the advertised network is a Wi-Fi network, spoofing the SSID (which identifies the Wi-Fi of the access point of the Wi-Fi network) may be prevented as the SSID is more unpredictable.

In some embodiments of the method, the out-of-band communications channel is a wired channel. In some embodiments, the broadcaster comprises a vehicle 100 such as that shown in FIG. 1 and described herein above, and the observer comprises a vehicle accessory 102 such as that shown in FIG. 1 and described herein above. Alternatively, in some embodiments of the method, the broadcaster comprises a vehicle accessory 102 and the observer comprises a vehicle 100. The vehicle may be a heavy-duty vehicle such as a truck or construction vehicle or the like and the vehicle accessory (102) may comprise a trailer in some embodiments. The out-of-band communications channel may comprise a wired channel or a CAN-bus connection between the vehicle (100) and the vehicle accessory (102).

Figure 3:
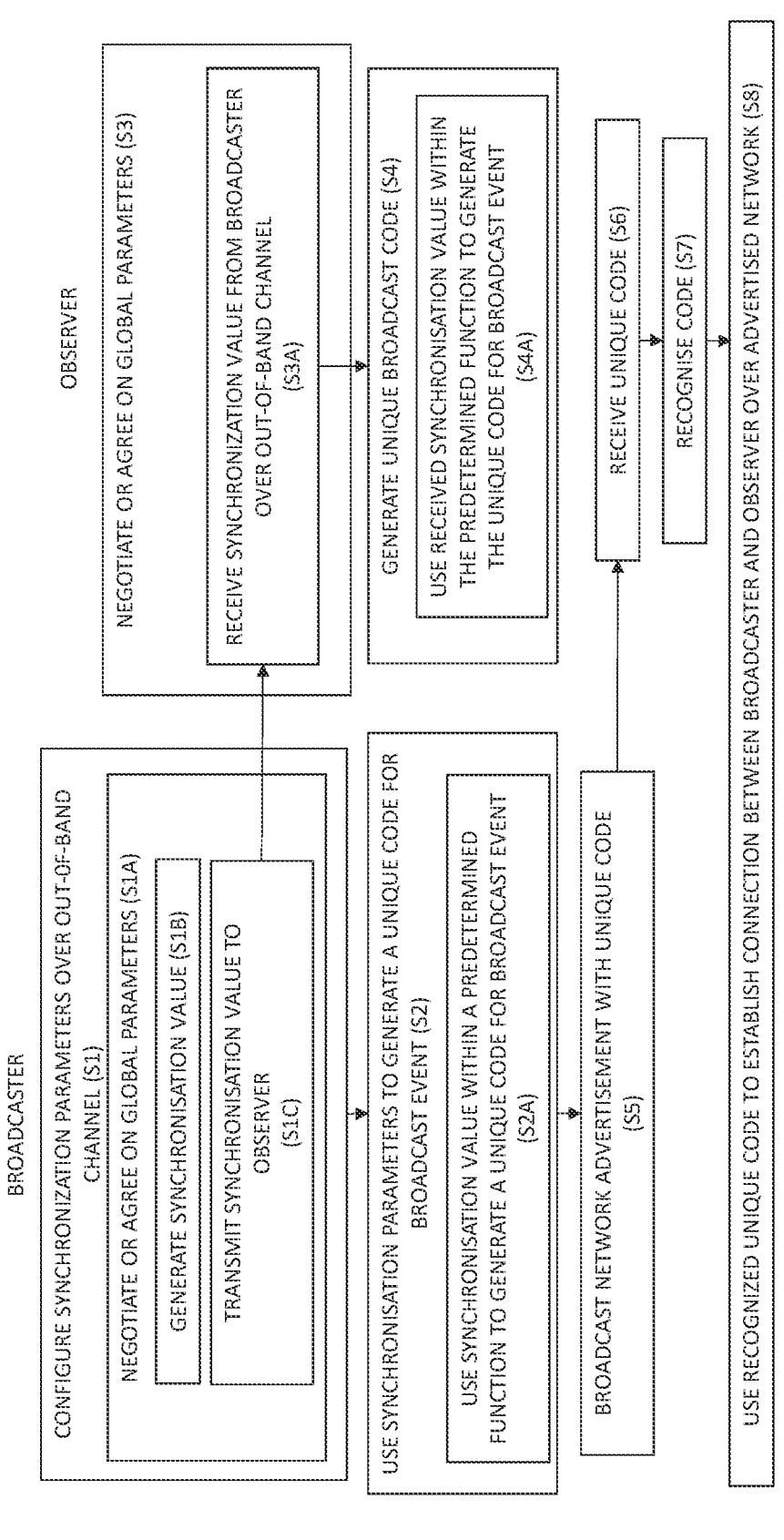
FIG. 3 is a schematic illustration of an implementation of the method in a vehicle arrangement according to an embodiment of the disclosed technology.

FIG. 3 shows a more detailed example embodiment of the method of FIG. 2. In FIG. 3, configuring synchronization parameters out-of-band (S1) comprises at the broadcaster prior to each broadcast network advertisement, comprises negotiating or agreeing on a global parameter with at least one observer in S1A. In some embodiments, the negotiating or agreeing comprises generating (in S1B) and then transmitting (in S1C) a random or initially random but incrementing value as a synchronization value. Using the synchronization value to generate a unique code for advertising a broadcast or broadcast event (in S2) may comprises using a synchronization value as a salt within a predetermined function to generate the unique code that is valid only for that individual broadcast event within the agreed synchronization parameters (shown as S2A in FIG. 3).

The method may further comprise, at an observer, negotiating or agreeing on global parameters in S2, which may include receiving the synchronization value over the out-of-band channel (shown as S3A in FIG. 3) from the broadcaster. The method further comprises generating the unique broadcast code in S4 in FIG. 3, for example, by using the synchronization value transmitted from the broadcaster within a predetermined function, for example, a hash code, to generate a unique broadcast code that is valid only for a subsequent individual broadcast event within the agreed synchronization parameters (shown as S4A in FIG. 3).

Once the unique broadcast code has been generated in S2, the broadcaster is able to advertise the network by broadcasting network advertising packets which include the unique code in S5 of FIG. 3. Each network advertising broadcast packet accordingly includes either the synchronization value as the unique broadcast identifier code or includes a function value derived from a function which operates on the synchronization value.

In some embodiments, an authentication routine may be performed as part of or prior to establishing a wireless connection between the broadcaster and the observer. For example, in some embodiments, the observer may be first authenticated using a shared secret based on a broadcast identifier and an observer identifier. The shared secret is different from the unique broadcast code.

In some embodiments, the broadcaster advertises a Wi-Fi network, and the wireless communications channel comprises a suitable form of Wi-Fi channel. In this case, the respective transceivers 104, 106*b* of the broadcaster apparatus 100 and observer apparatus 102 are Wi-Fi transceivers. See also the description of FIG. 5.

In some embodiments, the unique code is broadcast as an information element in a beacon frame.

Figure 4:
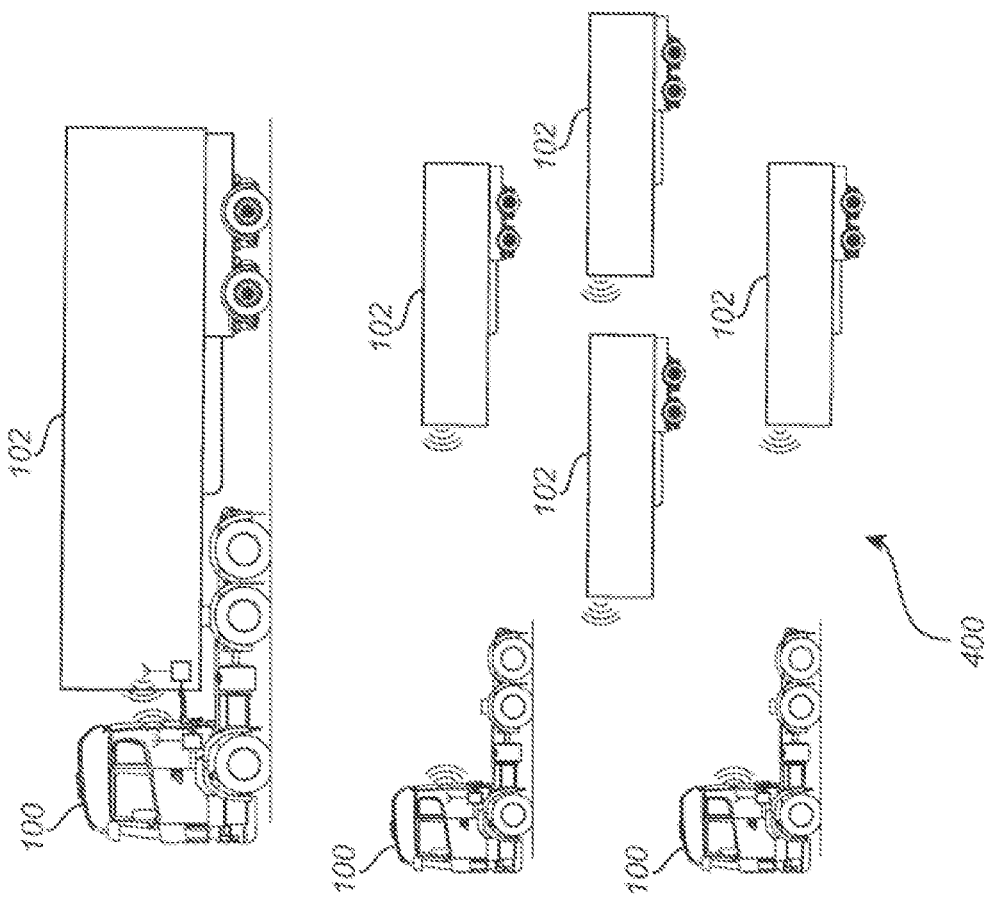
FIG. 4 is a schematic illustration of a fleet vehicle arrangement according to an embodiment of the disclosed technology.

Another example embodiment of the method will now be described with reference to a vehicle arrangement such as that shown schematically in FIG. 4 comprising a plurality of broadcasters and observers. In FIG. 4, any one of the vehicles or vehicle accessories may function as a broadcaster and any other one of the vehicles or vehicle accessories may function as an observer.

If each broadcaster in FIG. 4 transmits advertising network packets, such as beacons, containing the same code which each observer detected, there is a possibility for that observer to form a connection with the "wrong" broadcaster, unless each broadcast can be uniquely recognized by each receiver.

In the example embodiment shown in FIG. 4, each pair comprising a vehicle 100 and a vehicle accessory 102 forms a wired communication channel 108. For example, if each vehicle arrangement comprises, for example, a heavy-duty vehicle such as a truck 100 and a trailer accessory 102, the wired communication channel 108 may comprise a CAN-bus connection or similar type of connection, which is established by coupling a connector of the truck 100 to a corresponding connector of the trailer 102. A data connection over the wired communication channel 108 may be then established by a respective control unit 110 or 112 on the vehicle or vehicle accessory. In some embodiments, the control unit 110 or 112 controls data communication both via the wired communication channel 108 and via any subsequently established wireless connection 114 between the vehicle 100 and vehicle accessory 102.

Once the wired connection 108 is established, a synchronization value and one or more or all of the global parameters can be negotiated or agreed between that broadcaster and that observer. This allows unique broadcast identifier code to be determined which allows each observer to uniquely recognize that broadcaster.

Figure 5:
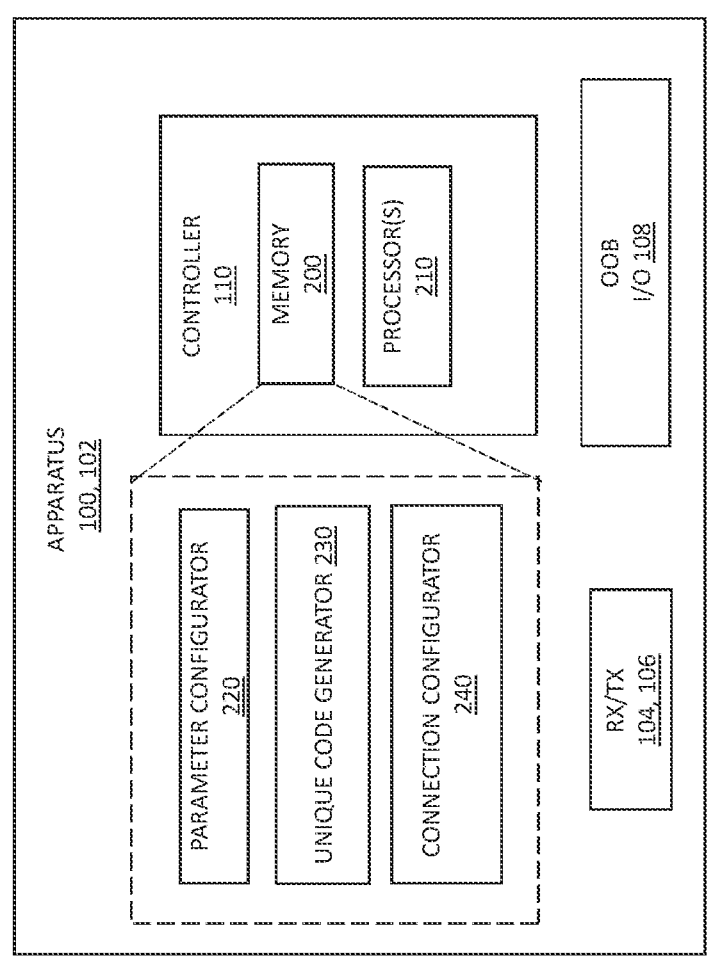
FIG. 5 is a schematic illustration of an apparatus including a controller according to some embodiments of the disclosed technology.

FIG. 5 shows an apparatus which may comprise a transmitter 100 or an observer 110, and which includes a suitable controller 110, 112 configured to use a memory 200, and one or more processors or processing circuitry 210. As shown in FIG. 5, the apparatus 100, 102 also comprises a suitably configure transceiver indicated as RX/TX 104, 106, as well as a suitably configured connector for forming an out-of-band data communications channel with another apparatus, shown as OOB I/O 108 in FIG. 5. Also shown in FIG. 5 is a global parameter configuration module 220, which may be implemented in software and/or coded as circuitry in 220, a unique conde generator module or circuitry 230, and a connection configurator 240, which may be configured to form one or both of a wired connection over the wired communications channels 108 or a wireless connection over a wireless communications channel 114.

In embodiments which use a Wi-Fi channel as a wireless communications channel, the transceivers of the broadcaster and observers are Wi-Fi transceivers 104, 106.

In some embodiments, the broadcaster comprises a vehicle 100 or vehicle accessory 102 which performs an embodiment of a method such as that shown in FIG. 2 or 3 described above to negotiate and agree on one or more global parameters which include a synchronization value from which a unique broadcast identifier code can be used in network advertising packets. When the vehicle 100 or vehicle accessory 102 transmits the network advertising packets, all of the other vehicles 100 or vehicle accessories 102 such as are shown by way of example in FIG. 4 may receive the advertising packets. However, only those vehicles 100 or vehicle accessories 102 which have previously formed an out-of-band channel via which they have received the correct global parameters and the synchronization value will be able to check if they can replicate the unique code and so properly identify the source of the network advertising packets. In other words, the unique broadcast identifier is regenerated at the observer using a least one global parameter including or based on the synchronization value and the wireless connection is then established with the vehicle or vehicle accessory which is the broadcaster. The other global parameters may be based on other capabilities of the broadcaster and the observer which are preconfigured prior to the broadcast event starting.

For example, in some embodiments, the preconfigured global broadcast parameters include the synchronization value, and may comprise one or more or all of the following global parameters based on the capabilities of both the broadcaster and the observer: a minimum network advertising broadcast interval between sequential network advertising broadcasts, a minimum network advertising broadcast synchronization, MinNABS offset comprising a minimum interval between transmission of a synchronization value and the network advertising broadcast, and a maximum network advertising broadcast synchronization, MaxNABS, offset comprising a maximum validity time-period for a synchronization value.

The broadcast identifier code in some embodiments is dynamic, as the synchronization value increments. The synchronization value may be random or pseudo random and thus acts as a salt. This enables the broadcast identifier code to also vary as a function of time or depend on the sequence number of each advertising broadcast in a broadcast event, and/or depend on when the broadcast event starts, and/or it may be updated during a broadcast event. In all cases, however, the observer is able to replicate and accordingly recognize the unique code as originating from a broadcaster with which it has previous agreed or negotiated to use a synchronization value to generate the unique code. In some embodiments, the broadcaster and observer have also agreed on a predetermined function to use with the synchronization value to generate the unique code.

In some embodiments, the unique code is broadcast in S5 as an information element in a beacon frame.

Returning to FIG. 4, a broadcaster may comprise a truck 100 or a trailer 102. Each truck or trailer is configured, under the control of their controllers 110, 112 (described in more detail below) to generate a unique broadcast identifier code using the method shown in FIG. 2 or 3. This unique broadcast identifier code may be, together with the accessory identifier, acted on using a predetermined function such as a hash function in some embodiments of the disclosed technology and the resulting unique code may also be subsequently broadcast in S5 by the vehicle wireless transceiver 104. The code may for example be broadcast as an information element in a beacon frame according to IEEE 802.11 based wireless communication. The code as mentioned above may be further processed with an identifier.

Returning to FIG. 3, the observer 102, for example, which may be a truck 100 or trailer 102 so as to form a truck-trailer pair with the broadcaster, derives the same unique code in S4 based on the vehicle identifier and the accessory identifier by using the same function as the broadcaster 100 so that the same unique broadcast code is the resulting output of the function when inputting the synchronization value. In some embodiments, and also as shown schematically in FIG. 3, when a unique code is received by the observer 102 in S6, the observer checks to see if recognizes the unique code, in other words, does it match a unique code that it has generated or generates responsive to receiving the unique code. In either case, if the two codes do not match, the connection attempt may be aborted.

In addition to the unique code, the beacon frame transmitted by the vehicle wireless transceiver 104 may include various information elements carrying information related to e.g. network name, channel parameters, security parameters etc. Accordingly if a plurality of networks are found by the trailer control unit 112 the appropriate information element of the network is analyzed to see if the unique code can be found in some embodiments.

It should be noted that in the above, the specific order of step may not be critical. The observer's transceiver 106 may, for example, have scanned for available networks and received one or more beacon frames comprising various information elements before deriving the unique code in some embodiments.

Returning again to FIG. 4, this schematically illustrates a situation where embodiments of the described technology may be advantageously implemented. FIG. 4 illustrates a place like a distribution center where a large number of trucks 100 and trailers 102 are located. If it assumed that each truck 100 has its own network and can thus act as a broadcaster, so that there may also be other networks within range, each trailer 102, acting as an observer, will have a large number of networks to select from when trying to establish a wireless connection with the correct trailer 100. Thereby, by having exchanged information via an out of band communication channel in the form of the wired connection, the trailer 102 can in a reasonably secure manner determine which network to connect to, thereby both providing a secure and convenient method of connection.

When the correct network has been found and the wireless connection between the truck and the trailer has been formed, it may further be required that the connection is authenticated. Such an authentication may be performed using known authentication methods based on a shared secret or by using certificates where a certificate of the accessory 100 is verified by means of a root certificate available in or accessible by the vehicle 102.

If a shared secret is also used to perform authentication, the shared secret may be derived using the vehicle identifier and the accessory identifier for example using a hash function. However, it is preferred that the shared secret used for authentication is different from the unique code used for finding the correct network.

In some embodiments where a vehicle 100 and vehicle accessory such as a heavy vehicle or truck and a heavy vehicle accessory such as trailer use the method shown in FIG. 2 or 3 to establish a wireless connection, the wireless connection is established (S8) between the wireless transceiver 104 of the broadcaster 100 and the wireless transceiver 106 of the observer 102 using the network characterized by the unique code. The observer and broadcaster seeking to form the wireless connection may also first authenticate each other. For example, in some embodiments, they may implement an embodiment of the method for establishing a wireless connection between a broadcaster such as a vehicle and an observer such as a vehicle accessory which includes, for example, authenticating the vehicle or vehicle accessory using a shared secret. The authenticating may comprise using a shared secret derived from a vehicle identifier and the accessory identifier, and wherein the shared secret is different from the unique broadcast code.

FIGS. 1 and 4 accordingly illustrate schematically systems for establishing a wireless communication channel between a broadcaster and an observer, the system comprising: means for configuring a plurality of synchronization parameters; and means for using at least one of the plurality of synchronization parameters to form a broadcast unique identifier code for a network advertising broadcast, wherein the synchronization parameters include one or more or all of the following global parameters based on the capabilities of both the broadcaster and the observer: a minimum network advertising broadcast interval between sequential network advertising broadcasts; a minimum network advertising broadcast synchronization, MinNABS offset comprising a minimum interval between transmission of a synchronization value and a network advertising broadcast; and a maximum network advertising broadcast synchronization, MaxNABS, offset comprising a maximum validity time-period for a synchronization value.

In some embodiments, the disclosed technology comprises a vehicle arrangement comprising: a vehicle 100 comprising a vehicle wireless transceiver 104, an accessory 102 comprising an accessory wireless transceiver 106, wherein either the vehicle 100 is configured to act as a broadcaster and the accessory 102 is configured to act as an observer and establish a communication channel 108 according to an embodiment of the disclosed methods or wherein the vehicle 100 is configured to act as an observer and the vehicle accessory 102 is configured to act as a broadcaster and establish a communications channel 108 using any of the disclosed methods.

In some embodiments, a controller 110 (as] shown in FIG. 5 being a controller 110, 112 for the transmitter or the observer) comprises a control system or control circuitry for controlling a broadcaster to establish a wireless connection with an observer, the control unit or circuitry 110 comprising memory, one or more processors or processing circuitry, and computer-program code which, when loaded from memory and executed by the one or more processors or processing circuitry causes the control system or control circuitry to perform one or more or all of the methods disclosed herein. In the methods, either the broadcaster of the method comprises a vehicle 100 and the observer comprises a vehicle accessory 102 or the broadcaster of the method comprises a vehicle accessory 102 and the observer comprises a vehicle 100.

In some embodiments, as mentioned above, when the correct network has been found and the wireless connection between the broadcaster 100 and the observer 102 has been formed, it may further be required that the connection is authenticated. Such an authentication may be performed using known authentication methods based on a shared secret or by using certificates where a certificate of the observer 100 is verified by means of a root certificate available in or accessible by the vehicle 102. If a shared secret is used to perform authentication, the shared secret may be derived using the vehicle identifier and the accessory identifier for example using a hash function. However, as mentioned above, it is preferred that the shared secret used for authentication is different from the unique code used for finding the correct network.

It is to be understood that the present invention is not limited to the disclosed embodiments that many other such modifications are possible and could be made within the scope of the inventive concepts.

While embodiments of the inventive concepts are illustrated and described herein, the device may be embodied in many different configurations, forms and materials. The present disclosure is to be considered as an exemplification of the principles of the inventive concepts and the associated functional specifications for their construction and is not intended to limit the inventive concepts to the embodiments illustrated. Those skilled in the art will envision many other possible variations within the scope of the present inventive concepts.

The foregoing description of the embodiments of the inventive concepts has been presented for the purpose of illustration and is not intended to be exhaustive or to limit the invention to the precise forms disclosed. Persons skilled in the relevant art can appreciate that many modifications and variations are possible in light of the above teachings. It is therefore intended that the scope of the inventive concepts be limited not by this detailed description, but rather by the claims appended hereto.

The invention claimed is:

1. A A method for establishing a wireless communication channel between a network advertising transmitter and an observer, the method comprising, at the network advertising transmitter:

configuring a plurality of global broadcast parameters between the network advertising transmitter and the observer using an out-of-band communication channel; and using at least one of the plurality of preconfigured global broadcast parameters to form a unique broadcast identifier code for a subsequent network advertising broadcast event, wherein the global broadcast parameters include one or more global broadcast parameters based on capabilities of both the network advertising transmitter and the observer and a synchronization value for the subsequent network advertising broadcast event, wherein the one or more configured global broadcast parameters comprise one or more or all of:

a minimum network advertising broadcast interval between sequential network advertising broadcast events;

a minimum network advertising broadcast synchronization, MinNABS offset comprising a minimum interval between transmission of the synchronization value and a subsequent network advertising broadcast event;

a maximum network advertising broadcast synchronization, MaxNABS, offset comprising a maximum validity time-period for the synchronization value, wherein the configuring of the global broadcast parameters using an out of band communication channel comprises at the network advertising transmitter, prior to each broadcast network advertisement event:

generating a random or initially random but incrementing value as the synchronization value; and transmitting the random or initially random but incrementing value as the synchronization value to the observer, wherein the unique broadcast identifier code comprises a unique code that is valid only for that subsequent individual broadcast network advertisement event within the agreed parameters, wherein the unique code is generated using a predetermined function based on the synchronization value transmitted to the observer.

2. The method of claim 1, wherein the network advertising event is broadcast or multicast by the network advertising transmitter.

3. The method of either claim 1, wherein configuring the global parameters comprises: negotiating the one or more global parameters via a negotiation algorithm executed by the network advertising transmitter and the observer prior to each broadcast network advertisement event; and transmitting one or more of the negotiated global parameters from the networks advertising transmitter to the observer.

4. The method of claim 1, wherein the network advertising transmitter comprises a vehicle and the observer comprises a vehicle accessory.

5. The method of claim 1, wherein the network advertising transmitter comprises a vehicle accessory and the observer comprises a vehicle.

6. The method of claim 1, wherein either the network advertising transmitter comprises one of a vehicle and vehicle accessory, and the observer comprises the other one of the vehicle accessory and vehicle accessory and, wherein the vehicle comprises a heavy-duty vehicle and the vehicle accessory comprises a trailer.

7. The method of claim 1, wherein either the network advertising transmitter comprises one of a vehicle and vehicle accessory, and the observer comprises the other one of the vehicle accessory and vehicle accessory and wherein the vehicle comprises a heavy-duty vehicle and the vehicle accessory comprises body builder equipment.

8. The method of claim 1, wherein the out-of-band communications channel is a wired channel.

9. The method of claim 1, wherein the out-of-band communications channel is a CAN-bus connection.

10. The method of claim 1, wherein the method further comprises, at the observer:

receiving the one or more global synchronization parameters including the synchronization value; and using the synchronization value within a predetermined function to generate the unique code that is valid only for that individual broadcast network advertisement event within the agreed synchronization parameters.

11. The method of claim 1, wherein the method further comprises, at the observer:

receiving the one or more global synchronization parameters including the synchronization value; and using the synchronization value within a predetermined function to generate the unique code that is valid only for that individual broadcast network advertisement event within the agreed synchronization parameters; and wherein the unique broadcast identifier code for the network advertising broadcast event identifies each broadcast network advertising packet.

12. The method of claim 1, wherein the method further comprises, at the observer:

receiving the one or more global synchronization parameters including the synchronization value; and using the synchronization value within a predetermined function to generate the unique code that is valid only for that individual broadcast network advertisement event within the agreed synchronization parameters; and the method further comprises: establishing a wireless connection between the wireless transceiver of the broadcaster and the wireless transceiver of the observer using the network characterized by the unique broadcast identifier code.

13. The method of claim 1, wherein the method further comprises, at the observer:

receiving the one or more global synchronization parameters including the synchronization value; and using the synchronization value within a predetermined function to generate the unique code that is valid only for that individual broadcast network advertisement event within the agreed synchronization parameters, wherein the predetermined function is a hash function.

14. The method of claim 1, wherein the method further comprises, at the observer:

receiving the one or more global synchronization parameters including the synchronization value; and

using the synchronization value within a predetermined function to generate the unique code that is valid only for that individual broadcast network advertisement event within the agreed synchronization parameters;

establishing a wireless connection between the wireless transceiver of the broadcaster and the wireless transceiver of the observer using the network characterized by the unique broadcast identifier code; and wherein establishing the wireless connection further comprises authenticating the observer using a shared secret, wherein the shared secret is based on a broadcast identifier and an observer identifier and wherein the shared secret is different from the code.

15. The method of claim 1, wherein the wireless communications channel is a Wi-Fi channel, and the transceivers of the network advertising transmitter and observers are Wi-Fi transceivers.

16. The method of claim 1, wherein the unique code is broadcast as an information element in a beacon frame.

17. A system for establishing a wireless communication channel between a network advertising transmitter and an observer, the system comprising computer code stored in a memory of the network advertising transmitter and computer code stored in a memory of the observer, wherein the network advertising transmitter comprises one or more processors or processing circuitry configured to execute the computer housed in the memory of the network advertising transmitter code and the observer comprises one or more processors or processing circuitry configured to execute the computer housed in the memory of the observer, the computer code stored in the memory of the network advertising transmitter comprising a set of instructions which when loaded from the memory and executed by the one or more processors or processing circuitry of the network advertising transmitter causes the network advertising transmitter to implement a method according to claim 1.

20

18. A vehicle arrangement comprising:
a vehicle comprising a vehicle wireless transceiver;
an vehicle accessory comprising an accessory wireless transceiver;
wherein the vehicle is configured to act as a network advertising transmitter and the vehicle accessory is configured to act as an observer and the vehicle accessory is further configured to establish a communication channel with the vehicle responsive to receiving a broadcast network advertisement from the vehicle when the vehicle performs the method of claim 1.

19. A vehicle arrangement comprising:
a vehicle comprising a vehicle wireless transceiver;
an accessory comprising an accessory wireless transceiver; wherein the vehicle is configured to act as an observer and the accessory is configured to act as a network advertising transmitter and the vehicle is further configured to establish a communications channel with the vehicle accessory responsive to receiving a broadcast network advertisement from the vehicle accessory when the vehicle accessory performs the method of claim 1.

20. A control unit or control circuitry for a network advertising transmitter apparatus or an observer apparatus comprising:
memory;
one or more processors or processing circuitry; and computer-program code which, when loaded from memory and executed by the one or more processors or processing circuitry causes the control system or control circuitry to control at least the network advertising transmitter to perform the method of claim 1, wherein either the network advertising transmitter of the method comprises a vehicle and at least one observer comprises a vehicle accessory or the network advertising transmitter of the method comprises a vehicle accessory and at least one observer comprises a vehicle.

* * * * *